Sept. 1, 1936.  E. C. S. CLENCH  2,052,547
HYDRAULIC BRAKE AND JACK
Filed Sept. 11, 1935  2 Sheets-Sheet 1

Inventor
Edward C. S. Clench
By Jno. Lawrie
Atty.

Sept. 1, 1936.   E. C. S. CLENCH   2,052,547
HYDRAULIC BRAKE AND JACK
Filed Sept. 11, 1935   2 Sheets-Sheet 2
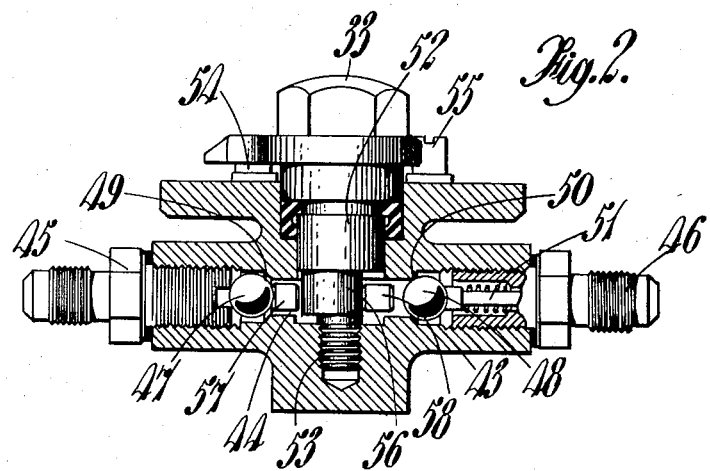
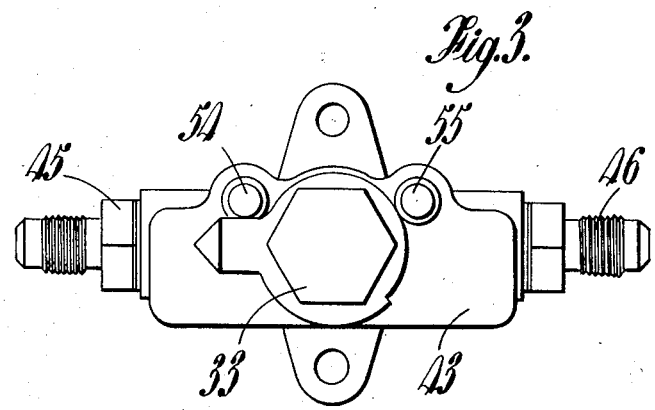
Inventor
Edward C. S. Clench Patented Sept. 1, 1936

2,052,547

UNITED STATES PATENT OFFICE 2,052,547

HYDRAULIC BRAKE AND JACK

Edward Claude Shakespeare Clench, Leamington Spa, England, assignor to Automotive Products Company Limited, London, England Application September 11, 1935, Serial No. 40,139
In Great Britain October 5, 1934

8 Claims. (Cl. 303—6)

This invention relates to hydraulic jack systems for vehicles, and especially to those in which the respective jack units form an integral part of the vehicle, and are arranged to be operated by a common pressure-producing device such as a hydraulic pump.

It is the primary object of the present invention to simplify such a system, and in accordance with the main feature of the invention, the jack system of a vehicle is actuated by the master cylinder or equivalent which is normally used for applying hydraulic braking means. By thus causing the brake master cylinder to operate the jacks, the necessity of providing separate pressure-producing means and also a reservoir for liquid to feed the jack system is completely avoided.

Thus, the invention provides in a motor vehicle, a jack system comprising a plurality of hydraulic jacks attached to the vehicle at or adjacent the axles, the power for operating said jacks being derived from a master cylinder normally employed for actuating the vehicle braking means. The jacks may conveniently be controlled by one or more valve devices which normally isolate said jacks from the braking system, a convenient arrangement where all four wheels are provided with jacks, consisting in the provision of a single valve for the front jacks and a similar single valve for the rear pair of jacks. Alternatively, of course, the front of the vehicle can be lifted by means of a single jack disposed at the centre of the front axle.

The valves for controlling the jack system in accordance with the invention may conveniently comprise a pair of opposing non-return valves, either one of which can be rendered ineffectual by being held off its seating, thus enabling complete and satisfactory control to be obtained during the raising and releasing of the jacks. Thus, the preferred construction of valve device comprises a body having a longitudinal passage, a pair of opposing non-return ball valves each arranged to close said passage, a cam member disposed between said ball valves, and external means whereby the cam member can be brought to bear directly or indirectly against one or other of the ball valves for maintaining it out of contact with its seating.

The invention is illustrated by way of example in the accompanying drawings, in which:

Figure 2 is a longitudinal sectional elevation to an enlarged scale through one of the controlling valve devices; and Figure 3 is a plan corresponding to Figure 2.

Figure 1:
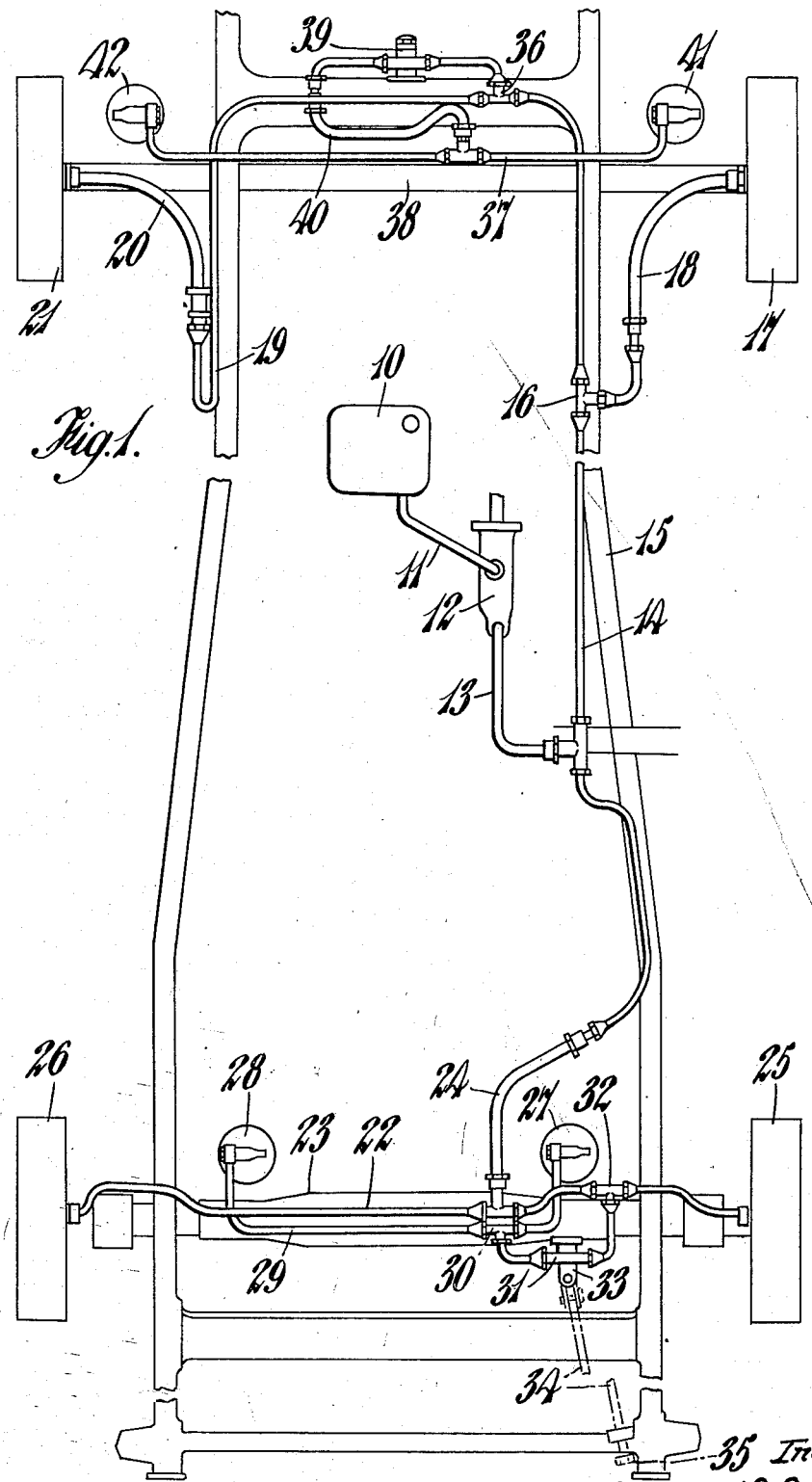
Figure 1 is a diagrammatic plan showing the lay-out of a combined hydraulic jack and braking system.

In the general lay-out shown in Figure 1, a reservoir 10 for hydraulic liquid, which reservoir is preferably of comparatively large size, feeds through a pipe 11 a common master cylinder 12 arranged to operate the braking system in the ordinary way, and also a jack system when required. The delivery from the master cylinder 12 is taken through a flexible pipe 13 to a main longitudinal pipe line 14 extending from the front to the rear of the vehicle, the chassis of which latter is indicated generally at 15 in thin lines. A T-piece is fitted at 16 for feeding one of the front brakes 17 through a flexible pipe 18, while the end portion 19 at the forward end of the pipe 14 is similarly connected by means of a flexible pipe 20 with the other front wheel brake 21.

At the rear of the chassis a pipe 22 is carried by the unsprung back axle 23 and is connected with the pipe 14 by means of a flexible connection 24, said transverse pipe 22 being arranged to feed the rear brake drums, indicated at 25 and 26. The details so far mentioned, with the exception perhaps of the extra large reservoir 10 constitute the usual parts of a hydraulic braking system, and the additional components in accordance with the invention for incorporating jacks in the hydraulic system will now be described.

A pair of rear jacks 27 and 28 are in the present example of the type arranged to be attached permanently to the rear axle 23, and are coupled together by a pipe 29 carried by said rear axle and having a T piece 30 connected by way of a valve 31 with a T piece 32 fitted in the transverse pipe 22. The valve 31, the construction of which will be hereinafter described, is provided with external operating means 33, conveniently in the form of a hexagonal head adapted to be rotated by a spanner or wheel brace, while in cases where the bodywork of the vehicle renders it impossible or inconvenient to gain direct access to the valve 31, an extension, indicated in broken lines at 34, may be universally joined therewith and may be arranged at its outer end 35 with a correspondingly shaped hexagonal portion or a turnkey whereby the valve 31 can be operated with ease.

Similarly, at the front of the vehicle a T piece 36 connects a transverse jack feed pipe 37 carried by the front axle indicated at 38, with the pipe 14 by way of a front control valve 39 and a flexible pipe 40, said pipe 37 being connected at its ends with a pair of hydraulic jacks 41 and 42 also secured to the front axle 38.

Turning now to the construction of the valves 31 and 39, as shown in Figures 2 and 3 it will be seen that each of these comprises a body 43 having a longitudinal passage 44 extending therethrough and provided with connecting unions 45 and 46. Within the passage 44 a pair of opposing non-return ball valves 47 and 48 are arranged to co-operate with corresponding seatings 49 and 50, the ball 48 being urged against its seating 50 by a spring-pressed plunger 51 so as normally to ensure that leakage of hydraulic liquid from the braking system to the jacks shall be entirely prevented. Disposed centrally between the ball valves 47 and 48 is a control member 52 carrying at its outer end the hexagonal head 33 or equivalent, said control member 52 being held in position within the body 43 by means of a screw-threaded spigot 53 so as to provide axial location and at the same time permit an angular movement amounting to about 180° between a pair of stops 54 and 55, as will be seen in Figure 3. Towards its inner end the member 52 is formed with a cam or eccentric 56 which, through the agency of spacing pieces 57 and 58 can co-operate with the balls 47 and 48 respectively, for holding either one of these off its seating.

When the valve is installed, the union 46 is connected with the pressure-producing master cylinder 12 through the pipelines of the braking system, while the union 45 is in communication with the cylinders of the jacks. In normal use of the vehicle, therefore, the member 52 is in the position shown in Figures 2 and 3, the ball 48 being permanently seated so as to permit the actuation and release of the brakes in accordance with normal practice.

It will be seen, however, that the ball 47 is held off its seat so that the jacks, which in the example shown are of the kind which retract under spring influence, can freely close when the braking system is not being used; any liquid expelled by the jacks being able to pass the non-return ball valve 48 and so enter the reservoir 10.

If, however, it is desired to bring the jacks into operation, the member 52 is rotated through 180°, thus unseating the ball valve 48, and seating the other ball valve 47. By this means pressure liquid delivered by the master cylinder can pass the operative non-return valve 47 for expanding the jacks, but on release of pressure from the master cylinder, such liquid cannot return. In this way successive operation of the master cylinder progressively lowers the feet of the jacks until the wheels are raised to the requisite extent. The jacks are, of course, released and the braking system once more brought into its operative condition, by returning the member or members 52 to the position shown in Figure 3, thus enabling the jacks to contract under spring pressure and expel the liquid past the non-return valve 48 to the reservoir 10.

It will be readily observed that the arrangement described is extremely economical in practice, as very little additional equipment is required beyond that usually forming part of a hydraulic braking system. It is found, moreover, to be extremely reliable and convenient in practice, and it is, of course, capable of being used in conjunction with all types of hydraulic jacking devices. The actual construction and arrangement of the parts can be modified without departing from the invention, any convenient type of valves or equivalent controlling means being utilized for bringing one or more of the hydraulic jacks into operation. Moreover, the jacks can be of any known or suitable type but are preferably of the type in which the foot is directly carried by the ram of a hydraulic cylinder disposed with its axis vertical.

1. A combined jacking and braking system of a motor vehicle, comprising hydraulic jacks permanently attached adjacent the wheels of the vehicle, hydraulically actuated brakes on the vehicle wheels, a reservoir feeding the jacks and the brakes, a single master cylinder unit receiving liquid from the reservoir and delivering it to the brakes and the jacks, and a valve positioned between the brakes and the jacks for controlling the actuation of the jacks.

2. A combined jacking and braking system of a motor vehicle comprising hydraulic jacks permanently attached adjacent the wheels of the vehicle, hydraulically actuated brakes on the vehicle wheels, a reservoir feeding the jacks and the brakes, a single master cylinder unit connected with the reservoir and delivering the liquid therefrom into a common pipe line system feeding the jacks and the brakes, and control valves interposed in said pipe line system between the brakes and the jacks for controlling the actuation of said jacks.

3. A combined jacking and braking system of a motor vehicle, comprising hydraulic jacks permanently attached adjacent the wheels of the vehicle, hydraulically actuated brakes on the vehicle wheels, a reservoir feeding the jacks and the brakes, a single master cylinder unit connected with the reservoir, a common pipe line system conducting liquid from the reservoir to the brakes and the jacks, and a reversible one-way valve interposed between the jacks and the brakes whereby liquid delivered by the master cylinder can be prevented from entering the jacks.

4. A combined jacking and braking system of a vehicle, comprising hydraulic jacks permanently attached adjacent the wheels of the vehicle, hydraulically actuated brakes on the vehicle wheels, a reservoir feeding the jacks and the brakes, a single master cylinder unit feeding liquid from the reservoir to a pipe extending longitudinally of the vehicle, brake pipe connections between the ends of the pipe and the brakes upon the front and rear wheels respectively, jack pipe connections between the respective ends of the longitudinal pipe and the jacks at the front and rear of the vehicle, and control valves in the jack pipe connections for putting the jacks into and out of action.

5. A combined jacking and braking system according to claim 4, in which each of the control valves comprises a one-way valve having externally actuated means whereby the direction in which it allows flow to take place may be reversed.

6. A combined jacking and braking system according to claim 4, in which each of the control valves comprises a body, a passage therethrough, a pair of valve members seating in opposite directions in said passage, and externally actuated means arranged to unseat one or other of the valve members according to whether or not the jacks are to be operative.

7. A combined jacking and braking system according to claim 4, in which each of the control valves comprises a body, a passage extending therethrough, a pair of seatings facing in opposite directions, a ball on each seating, a spring tending to press the ball against the seating, an eccentric externally rotatable member disposed between said balls, and blocks disposed between the rotatable member and the balls, so that either one or the other of said balls is held off its seating according to the angular position of the rotatable member.

8. A combined jacking and braking system according to claim 2, in which a control valve, disposed adjacent the rear of the vehicle for controlling the jacks associated with the rear wheels, is connected with one end of an extension rod having its other end disposed in a convenient position for actuation.

EDWARD CLAUDE SHAKESPEARE CLENCH.